United States Patent [19]

Schweiger

[11] 4,147,847

[45] Apr. 3, 1979

[54] METHOD OF PREPARING FLEXIBLE FLAME RETARDANT POLYETHER BASED ONE-SHOT POLYURETHANE FOAMS AND COMPOSITIONS THEREFORE

[75] Inventor: Carl W. Schweiger, Coleman, Mich.

[73] Assignee: Dow Corning Corporation, Midland, Mich.

[21] Appl. No.: 415,607

[22] Filed: Nov. 14, 1973

[51] Int. Cl.$^2$ .............................................. C08J 9/00
[52] U.S. Cl. ..................................... 521/112; 521/50; 521/126; 521/127; 521/155; 521/174; 521/906; 260/448.8 R; 528/23; 528/37; 528/29
[58] Field of Search .................... 260/2.5 AH, 2.5 AJ; 521/50, 112, 126, 127, 155, 906, 174

[56] References Cited

U.S. PATENT DOCUMENTS

| | | | |
|---|---|---|---|
| 3,398,104 | 8/1968 | Haluska | 260/2.5 AH |
| 3,402,192 | 9/1968 | Haluska | 260/2.5 AH |
| 3,505,377 | 4/1970 | Morehouse | 260/2.5 AH |
| 3,518,288 | 6/1970 | Haluska | 260/2.5 AH |
| 3,706,681 | 12/1972 | Bachura | 260/2.5 AH |
| 3,741,917 | 6/1973 | Morehouse | 260/2.5 AH |
| 3,779,956 | 12/1973 | Morehouse | 260/2.5 AH |
| 3,793,300 | 2/1974 | Prokai | 260/2.5 AH |
| 3,796,676 | 3/1974 | Kanner | 260/2.5 AH |

Primary Examiner—Melvyn I. Marquis
Attorney, Agent, or Firm—Robert L. McKellar

[57] ABSTRACT

A method of preparing flexible flame retardant, one-shot polyether based polyurethane foams is disclosed, in which the flame retardancy and the physical properties of the resulting foams are maintained by utilizing specific foam stabilizers which reduce the normal amount of required flame retardant additives.

13 Claims, No Drawings

METHOD OF PREPARING FLEXIBLE FLAME RETARDANT POLYETHER BASED ONE-SHOT POLYURETHANE FOAMS AND COMPOSITIONS THEREFORE

Since the early 1950's the polyurethane foam industry has seen the growth of the use of polyurethane foams in an ever-widening number of applications.

Some applications, however, were never even considered in depth because of the fact that the hazards of flammability of the materials, including polyurethane foam, was too great.

In the preceding decade and eventually into the present decade, emphasis has been placed on rendering polyurethane foams, and the materials they are associated with, less subject to fire. Naturally, if the foams and the materials they are associated with are made nonflammable or at least more resistant to fire than standard polyurethanes, the applications utilizing polyurethane foams can be extended beyond the areas of application considered in the 1950's.

Improved foam flame retardance can be obtained in several ways. Additives to the normal foam, the use of foam reactants that contain halogen and/or phosphorus groups, using foams having higher crosslink densities, and so forth, all give some measure of flame retardancy to cured polyurethane foams.

The interest in foam that has flame retardant properties runs beyond the commercial producer, however, and a great deal of the interest lies with insurance companies who would like to see safer materials and the United States Government which has the need to supervise the safety of the consuming public.

It would seem that the greater interest lies with the Government, both local and Federal, however, in that current activity shows that during the past several years new legislation has been passed which sets up regulations governing the use of flexible polyurethane foams. In addition, because of the confusion over terminology in the art and the lack of knowledge of the art by the consuming public, some fire disasters and near fire disasters have taken place because of the reliance on products which purport to be "flameproof". Thus, the Government has a more-than-ever compelling need to have an interest in flame-retardant foams and a more compelling need to have stricter specifications for flame retardant foams as well as other flame retardant materials.

Thus it becomes imperative that producers of polyurethane foams find some way of producing foams that will conform to the new standards while maintaining the lower costs necessary to make the operation economically feasible. Further, with some of the current methods of producing foam, the physical properties of the foam are affected and while the producer maintains the necessary safety standards and maintains the operative economic status, he must also remember that the foam must exhibit the other necessary physical properties to even be useful to users.

Thus, the producer is faced with this three-faceted dilemma and the object of the present invention is to overcome the problems of the producer, and eventually the consuming public, by reducing the hazards of flammability of foams.

An additional object is to maintain acceptable physical properties of the foam while reducing the hazards of flammability.

Another object of the invention is to allow the producer to maintain a feasible economic status while reducing the hazards of flammability of flexible polyurethane foam by reducing significantly the required amount of flame retardant additive.

Still another object of the invention is to give the producer more latitude in the types of flame retardant additives employed to give flame retardant properties to flexible polyurethane foam.

It has now been found that the use of certain siloxane-oxyalkylene copolymers as foam stabilizers in flexible, polyether based polyurethane foams will allow the production of foams which conform to ASTM-D 1692 test standards and have the necessary physical properties, while using "significantly less" than the "required amount" of flame retardant additive.

By "required amount" we mean that heretofore in order to conform to the ASTM-D 1692 test standards a minimum amount of 8-25 parts of flame retardant additive based on 100 parts of base polyol was required. By "significantly less" we mean that as great as less than one-half of the "required amount" is all that is required to obtain foams that conform to the test standards of ASTM-D 1692. For instance, normally, 8-25 parts per 100 parts of base polyol is required in processes heretofore, while in the instant invention less than 8 parts per 100 parts of base polyol and not less than 3.5 parts per 100 parts of base polyol give the necessary flame retardancy. See for instance R. M. Pruitt, "Thermal Stability of Flame Resistant Flexible Urethane Foams", 2nd International Cellular Plastics Conference, (1968), Table V and U.S. Pat. No. 3,487,030 at column 2, lines 15-20.

Obviously, this invention gives rise to cost savings by utilizing less than one-half of an expensive flame retardant additive.

Moreover, this invention gives rise to "processing latitudes" not heretofore available. By "processing latitudes" we mean that more types of flame retardant additives can be used because some types used heretofore in normal amounts would affect the foam physical properties while with the certain siloxane-oxyalkylene foam stabilizers of this invention, those additives now give foams which have acceptable physical properties while maintaining the standards of the previously cited ASTM Test for flammability.

In addition, more types of flame retardant additives can be used because heretofore where large quantities of certain types of flame retardants were required to give the necessary flame retardant properties, the foam physical properties were usually affected. By the process of this invention, the amount of flame retardant additive can be cut back to the point where the foam physical properties are not affected and yet the flame retardant properties of the foam are not reduced thereby.

The objects of this invention are met by utilizing the method of this invention which consists of preparing a flexible one-shot polyether based polyurethane foam which method includes the steps of (I) preparing a homogeneous mixture consisting essentially of
  (a) 100 parts by weight of a polyether containing at least two hydroxyl groups,
  (b) a sufficient amount of organic polyisocyanate to give from 90-120 percent, on a stoichiometric basis, of isocyanate radicals for each hydroxyl radical in the composition,
  (c) 0.05-0.6 parts per hundred of (a) of a catalyst for the production of the polyurethane foam,
  (d) 1-10 parts by weight of a blowing agent, (e) 3.5–7.9 parts by weight of a flame retardant, and (f) 0.1–5.0 parts per hundred of (a) of a siloxane-oxyalkylene copolymer selected from the group consisting of copolymers having the average structural formulae (i) $R_aSi[(OSiMe_2)_n(OSiMeG)_dOSiMe_2G]_{4-a}$,
(ii) $GMe_2Si(OSiMe_2)_n(OSiMeG)_bOSiMe_2G$,
(iii) $Me_3Si(OSiMe_2)_n(OSiMeG)_cOSiMe_3$,
(iv) $R_aSi[(OSiMe_2)_n(OSiMeG)_cOSiMe_3]_{4-a}$ or mixtures thereof, in which formulae R is a hydrocarbon radical free of aliphatic unsaturation and contains from 1 to 10 carbon atoms, Me is a methyl radical, G is a radical of the structure $-D(OR'')_mA$ wherein
D is an alkylene radical containing from 1 to 30 carbon atoms,
R'' is composed of ethylene radicals and radicals selected from the group consisting of propylene and butylene radicals, the amount of ethylene radicals relative to the other alkylene radicals being such that the ratio of carbon atoms to oxygen atoms in the total OR'' block ranges from 2.3:1 to 2.8:1,
m has an average value from 25 to 100,
A is a radical selected from the group consisting of the $-OR'$, $-OOCR'$ and $-OCOR'$ radicals wherein R' is a radical free of aliphatic unsaturation selected from the group consisting of hydrocarbon and radicals, the A radical containing a total of less than eleven atoms,
a has an average value from 0–1,
n has an average value from 6–420,
d has an average value from 0–30,
b has an average value from 1–30, and
c has an average value from 3–30 to the extent that the ratio of total Me₂SiO units to total

units is within the range of 3.5:1 to 15:1, (II) thereafter allowing the mixture to foam, and (III) curing the foamed composition, whereby a flexible polyurethane foam having flame retardant properties is obtained.

The usual method of this invention is to combine ingredients (a), (c), (d), (e) and (f) in any suitable container and homogenize them using any suitable means such as an Eppenbach mixer or the like. The component (b) is then added, the mixture again homogenized and the foam allowed to rise in the container. The foam is then cured at elevated temperatures (usually 225° F.) and then removed from the container for use later. In another method, the components can be metered and mixed automatically so that the separate steps of adding component (b) can be eliminated. Both of these methods are known in the prior art with the exception of the use of component (f) of the present invention.

The essence of the present method is the use of significantly lesser amounts of component (e) in conjunction with certain siloxane-oxyalkylene copolymers, component (f).

It is the certain siloxane-oxyalkylene copolymers when used as foam stabilizers that allows the use of significantly lesser amounts of the flame retardant additive (e).

For instance, those normally used siloxane-oxyalkylene copolymers found in the prior art and which fall outside the scope of the siloxane-oxyalkylene copolymers discussed above do not allow one skilled in the art to produce polyurethane foams, which have flame retardant properties in conjuction with good physical properties, unless large quantities of special flame retardant additives are used.

Because of the discovery that certain siloxane-oxyalkylene copolymers having a certain ratio of total Me₂SiO units to total

units within the range of 3.5:1 to 15:1, we have advanced the art beyond that which was known concerning flame retardancy of polyurethane foams heretofore. Furthermore, other factors such as the molecular weight of the siloxane precursors for the siloxane-oxyalkylene copolymers or the increased overall molecular weight of the siloxane-oxyalkylene copolymer itself do not give the same effect. Thus the ratio of total Me₂SiO units to

units is significant and the effect therefrom is entirely unexpected.

As component I(a), polyethers containing at least two hydroxyl groups, there may be used hydroxyl endblocked polymers or copolymers of cyclic oxides, for example, 1,2-alkylene oxides such as ethylene oxide, epichlorohydrin, 1,2-propylene oxide, 1,2-butylene oxide and 2,3-butylene oxide, oxacyclobutane and substituted oxacyclobutanes and tetrahydrofuran. They may be linear polyether glycols as are prepared, for example, by the polymerization of an alkylene oxide in the presence of a basic catalyst, such as potassium hydroxide, and a glycol or a primary monoamine. Alternatively, there may be used branched polyethers prepared, for example, by the polymerization of an alkylene oxide in the presence of a basic catalyst and a substance having more than two active hydrogen atoms per molecule, for example, ammonia and polyhydroxy compounds such as glycerol, hexanetriols, trimethylolpropane and ethane, triethanolamine, pentaerythritol, sorbitol, sucrose and phenol-formaldehyde reaction products, aminoalcohols such as monoethanolamine and diethanolamine and polyamines such as ethylene diamine, hexamethylenediamine, diethylene triamine, tolylene diamine and diaminodiphenylmethane. Branched polyethers may also be produced by copolymerizing a cyclic oxide of the type already mentioned with cyclic oxides having a functionality greater than two, for example, diepoxides, glycidol and 3-hydroxymethyloxacyclobutanes.

The polyethers used according to this invention normally have molecular weights of from 200 to 6000 grams per mole. Mixtures of linear and branched polyethers may be used if desired. The polyethers are normally used in the amount of 100 parts by weight and the remainder of the components are based upon the base polyol.

Component I(b), organic polyisocyanates, which are suitable in this invention include aliphatic diisocyanates such as hexamethylene diisocyanate, aromatic diisocyanates such as toluene-2,4-diisocyanate, toluene-2,6-diisocyanate and the familiar 80:20 mixtures of the 2,4 and 2,6 toluene diisocyanates, diphenylmethane-4,4-diisocyanate, 3-methyldiphenylmethane-4,4'-diisocyanate, m- and p-phenylene diisocyanate. Other suitable isocyanates comprise the reaction products of an excess of the diisocyanate with polyhydric alcohols such as trimethylolpropane.

The isocyanates are employed in the invention on the basis of an "NCO Index". By this is meant that the polyisocyanate is used in such quantities so as to give from 10% less than stoichiometric quantities of —N=C=O to total hydroxyl to 20% greater than stoichiometric quantities of —N=C=O to total hydroxyl in the system. Thus, the Index employed in this invention is within the range of 90–120 percent. If a 1:1 stoichiometric quantity of —N=C=O to hydroxyl were used for example, the NCO Index would be 100. For the most part, an NCO Index of 105 is preferred for best results.

Component I(c), a catalyst for the production of the polyurethane foam includes both prior art amines and soluble organic compounds of heavy metals. Examples of amines useful in this invention include triethylenediamine and N-ethylmorpholine and examples of organic compounds of heavy metals are dibutyl tin dilaurate and stannous octoate. Mixtures of catalysts may be advantageous at times. The catalysts are used in the amounts ranging from 0.05–0.6 parts based on 100 parts of the base polyol. Preferably, if amines are employed the amount ranges from 0.05–0.3 parts and when metal salts are used the preferred range is 0.1 to 0.6 parts based on 100 parts of the base polyol.

Component I(d), the blowing agent, is water or a low-boiling organic liquid. The blowing agent can be a mixture of water and a low-boiling liquid. The low-boiling liquid should be chemically inert towards the isocyanates and water and have a boiling point less than that of water, preferably much lower as for instance 75° C. or less.

Such low-boiling liquids include fluorinated alkanes such as monofluorotrichloromethane. Such low-boiling liquids include chlorinated alkanes such as methylene chloride.

The blowing agent is used in the amount of 1–10 parts per 100 parts of the base polyether. When water is the sole blowing agent it is preferred to use from 2.0–4.5 parts per 100 parts of base polyether and when halogenated alkanes are the sole blowing agents it is preferred to use from 1–10 parts per 100 parts of base polyether. Mixtures of halogenated alkanes are also useful.

Component (e), the flame retardant additives, are commercially available materials and are well known in the art. The most commonly known are the phosphates such as tris-(dibromopropyl)phosphate and tris(dichloropropyl)phosphate, and the phosphonates such as bis-(bromopropyl)bromopropane phosphonate. In usage with normal polyurethane foam processes these materials are utilized in the amounts of 8–25 parts per 100 parts of base polyol. In the instant invention, however, they are only required to be present in the amount of 3.5 to 7.9 parts per 100 parts of base polyol. Most preferably, they are used in the amount of 5–7 parts per 100 parts of base polyol.

Greater or less quantities within the broad range described above are desirable in some cases where the flame retardant additive has an adverse effect on the foam properties, or where the additive does not affect the foam properties but does not give the desirable flame retardancy effect.

The final component I(f), the siloxane-oxyalkylene foam stabilizer is the most important aspect of this invention.

When in use in this invention, the foam stabilizer is used in the amounts of 0.1–5 parts per 100 parts of base polyol. The preferred range is 0.5 to 1.5 parts per 100 parts of base polyol.

The siloxane-oxyalkylene copolymer is prepared by reacting a monoalkylene ether, preferably the allyl ether, of the desired polyalkylene glycol with a siloxane containing SiH group.

The reaction is carried out by heating a mixture of the two reactants in the presence of a platinum catalyst such as chloroplatinic acid dissolved in a small amount of isopropyl alcohol, at temperatures from 100 to 200° C.

The siloxanes can be of four formulae:

  (1)

  (2)

  (3)

  (4)

wherein R, n, b, c, a and d are defined above.

Any siloxane 1–4 or mixtures of siloxanes 1–4 can be utilized which give rise to a copolymer when reacted with an unsaturated glycol, in which the ratio of total Me₂SiO units to total

units are derived from the corresponding SiH units so that the same number ratio of Me₂SiO units to SiH units prevails as for the Me₂SiO units to

units.

The above siloxanes are prepared by cohydrolyzing the appropriate silanes as for instance in (1) above, a mixture of silanes such as $R_aSiX_{4-a}$ with dimethyldichlorosilane, methyldichlorosilane, and dimethylmonochlorosilane and thereafter equilibrating the cohydrolyzate with an acid catalyst such as $H_2SO_4$. (2) is prepared by cohydrolyzing the silanes in proportion of n mols of dimethyldichlorosilane, two mols of dimethylmonochlorosilane, and b mols of methyldichlorosilane. Once again the hydrolyzate is $H_2SO_4$ equilibrated. (3) is prepared by cohydrolyzing the silanes in the proportion of n mols of dimethyldichlorosilane, two mols of trimethylmonochlorosilane and c mols of methyldichlorosilane. Once again the cohydrolyzate is equilibrated with $H_2SO_4$. (4) is prepared by cohydrolyzing one mol of silane of the formula $R_aSiX_{4-a}$ with n mols of dimethyldichlorosilane, c mols of methyldichlorosilane and at least 4-a mols of trimethylchlorosilane and thereafter equilibrating with $H_2SO_4$. In such case, X is chlorine.

Another method of preparing the siloxanes is to equilibrate siloxanes that have already been hydrolyzed. Such a method for instance would involve the equilibration at temperatures in excess of 50° C., a mixture of n units of Me$_2$SiO in the form of octamethylcyclotetrasiloxane, b units of (MeHSiO) in the form of (MeHSiO)$_4$ and 1 unit of (HMe$_2$Si)$_2$O in the presence of an equilibrating catalyst. Such equilibrating catalysts are known in the art and consist of acid clays, acid treated melamine type resins and fluorinated alkanes with sulfonic acid groups. For those unfamiliar with such preparations, they can be found in detail in U.S. Pat. No. 3,402,192 and that patent is hereby incorporated by reference.

The monoalkenyl ether endblocked polyalkylene glycols can be copolymers of ethylene oxide and propylene oxide or copolymers of ethylene oxide and butylene oxide or can be copolymers of all three oxides. The ratio of ethylene radicals relative to the other alkylene radicals should be such that the ratio of carbon atoms to oxygen atoms in the glycol copolymer ranges from 2.3:1 to 2.8:1. In addition, the ends of the polyglycol chain not attached to the siloxane moiety have a group A wherein A is defined above.

These glycol copolymers can be linear or branched and can contain any number of carbon atoms.

One method of preparing the glycol copolymers is to dissolve sodium metal in allyl alcohol in a mole ratio of one to one and reacting the resulting product with the appropriate oxides at elevated temperatures and under pressure. The resulting product, after purification by removal of low boilers, is then capped with the appropriate group A.

The siloxane-oxyalkylene copolymer is then prepared by reacting the appropriate siloxane precursor and the appropriate polyglycol copolymer at elevated temperatures in the presence of platinum as the catalyst and a solvent if desired.

The siloxane-oxyalkylene copolymer is then used neat or optionally with a glycol diluent in the foam formulation. Such a diluent, for example, can be dipropylene glycol.

The following examples are illustrative only and should not be construed as limiting the invention. For those unfamiliar with such preparations, they can be found in detail in U.S. Pat. No. 3,402,192 and that patent is hereby incorporated by reference.

In the examples and claims, Me is employed as an abbreviation for the CH$_3$ — radical, IPA is employed as the abbreviation for isopropyl alcohol and all viscosities and refractive indices were measured at 25° C. unless otherwise specified.

All the data generated in the examples regarding flame retardancy was generated via the ASTM 1692 self-extinguishing test. All statements relative to "burning", "non-burning", "flame retardancy" and "flame retardant effect" were made from the ASTM-D 1692 Test as the prevailing standard in the industry at the time the data was generated.

EXAMPLE 1

This example illustrates the preparation of a siloxane-oxyalkylene copolymer.

Into a 1 liter, 3-necked flask equipped with a glass rod stirrer, glass stopper and a nitrogen sweep apparatus was placed a siloxane having the average formula (HMe$_2$Si)$_2$O(Me$_2$SiO)$_{106}$(MeHSiO—$_{17}$ which has 37% of (Me$_3$Si)$_2$O(Me$_2$SiO)$_{106}$(MeHSiO—$_{17}$. To this was added a monoalkenyl endblocked polyoxyalkylene glycol which had the following general formula

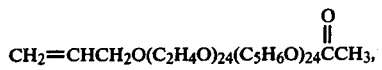

and 115 ml. of IPA, and the mixture heated to 50° C. and was catalyzed with 50 μl of a solution of H$_2$PtCl$_6$.6 H$_2$O in IPA (0.1 molar). After 5 minutes, an exotherm was observed which carried the temperature to reflux. The mixture was heated at reflux for 30 minutes and then stripped of the volatiles at 130° C. and 50 mm. The resulting product was a liquid, amber in color and clear. It has a viscosity of 1,435 centistokes and had an average formula corresponding to

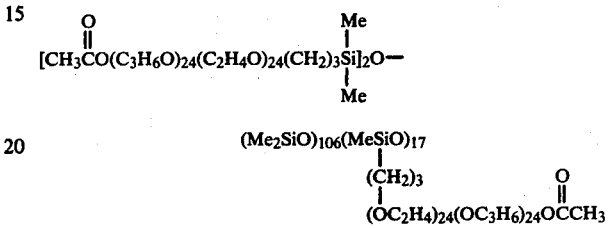

in which there is 37% of

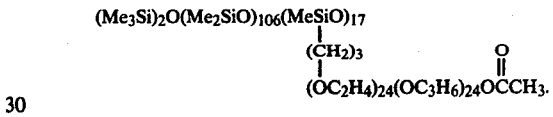

The

ratio is 5.2.

EXAMPLE 2

A siloxane with the average formula (Me$_3$Si)$_2$O(Me$_2$SiO)$_{84}$(MeHSiO)$_{21}$ with 67% of (HMe$_2$Si)$_2$O(Me$_2$SiO)$_{84}$(MeHSiO)$_{21}$, was reacted in the manner of Example 1 with the same glycol as illustrated in Example 1.

The resulting copolymer had a viscosity of 1486 centistokes and the average formula: (Me$_3$Si)$_2$O(Me$_2$SiO)$_{84}$(MeSiO)$_{21}$

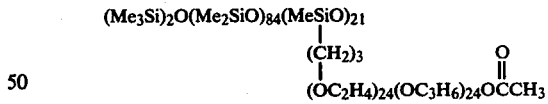

with 67% of

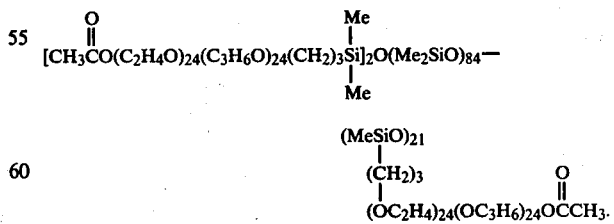

The

ratio was 4.0.

EXAMPLE 3

This example illustrates the foam stabilizing ability of the siloxane-oxyalkylene copolymers of this invention.

In this example, all of the ingredients are based on 100 parts of the polyether triol.

100 parts by weight of a Voranol ® which is a water insoluble polyether triol of alkylene oxide containing 10% ethylene oxide, 90% propylene oxide and which has a molecular weight of approximately 3800 was intimately mixed with 4.50 parts of water, 3.25 parts of methylene chloride, 0.40 parts of a catalyst which is a tin catalyst i.e. Stannous octoate in which 50% of the octoate groups have been substituted with dioctylphthalate groups and 1.40 parts of the siloxane-oxyalkylene copolymer of Example 1. Thereafter, 53 parts of an 80/20 mixture of the 2:4 and 2:6 isomers of toluene diisocyanate are added and stirred in rapidly for 5–6 seconds after which the mixture is allowed to stand and react. The result was a foam which had fine uniform cells.

EXAMPLE 4

This example illustrates the invention. In this example, five siloxane-oxyalkylene copolymers were prepared and used to prepare flexible polyether based polyurethane foams in which the following formulation was used

| A) | Voranol cp3810+ | 160 parts by weight |
|---|---|---|
| B) | Water | 7.2 parts by weight |
| C) | Methylene chloride | 5.2 parts by weight |
| D) | T-10 Catalyst[1] | .64 parts by weight |
| E) | Surfactant | 2.24 parts by weight |
| F) | TDI | 84.9 parts by weight |
| G) | Flame Retardant[2] | 11.2 parts by weight |

+B-G based on 100 parts of A.
[1]T-10 is the catalyst of Example 3.
[2]Tris(2,3-dibromopropyl)phosphate (11.2 parts of flame retardant in this formulation equivalent to 7.0 parts per 100 parts of polyol.

The siloxanes used to prepare the copolymers all had molecular weights of 12,000 grams/mole. The only variation was the ratio of

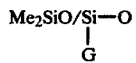

units.

When tested under the conditions of ASTM-D 1692 the following foams had the indicated length of burn before self-extinguishing.

| Foam Sample No. | Me$_2$SiO/$\underset{G}{\overset{SiO}{|}}$ Ratio | Length of Burn |
|---|---|---|
| 1 | 16 | 4 inches |
| 2 | 8.8 | 1¾ inches |
| 3 | 6.2 | 1 inch |
| 4 | 4.7 | ⅝ inch |
| 5 | 3.7 | ¼ inch |

This data clearly illustrates that the flame retardancy effect is dependent upon the

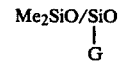

ratio of the siloxane-oxyalkylene copolymer. Note that the level of flame retardant is well below the minimum used heretofore.

EXAMPLE 5

This example illustrates the invention using a very low amount of flame retardant additive.

The foam stabilizer of this example was prepared in the manner of Example 1 except the

ratio was 8.8.

The foam was prepared in a manner similar to Example 4 using the following formulation:

|  | Parts |
|---|---|
| Pluracol 506+ | 100 |
| Water | 3.0 |
| Niax A-1 | 0.12 |
| Stannous Octoate | 0.20 |
| TDI | 38 |
| Flame Retardant[1] | 4.0 |
| Surfactant | 0.8 |

+3600–3700 M.W. glycerin based triol polyether manufactured by Wyandotte Chemical Co.
[1]tris(2,3-dibromopropyl)phosphate.

The length of burn in ASTM-D 1692 test = 3.8 inches.

EXAMPLE 6

When the following foam stabilizers were substituted for the foam stabilizers of Example 4, similar results were obtained.

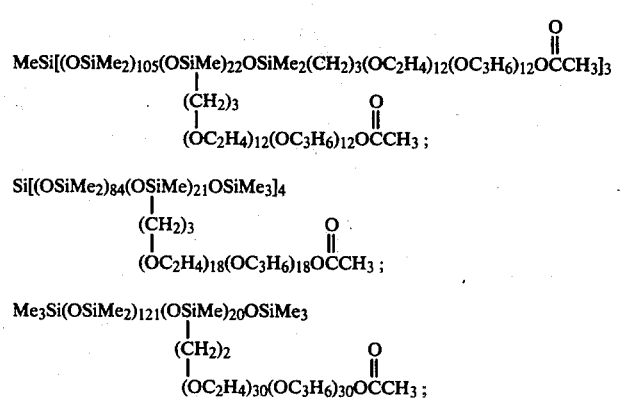

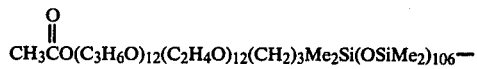

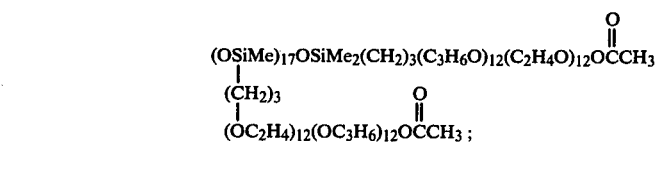

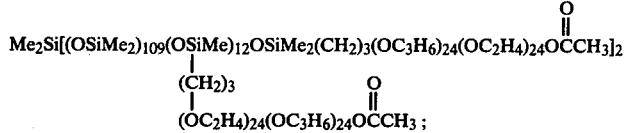

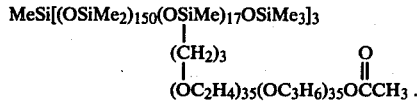

That which is claimed is:

1. A method of preparing a flexiable one-shot polyether based polyurethane foam which method includes the steps of
   (I) preparing a homogeneous mixture consisting essentially of
   (a) 100 parts by weight of a polyether containing at least two hydroxyl groups,
   (b) a sufficient amount of organic polyisocyanate to give from 90–120 percent, on a stoichiometric basis, of isocyanate radicals for each hydroxyl radical in the composition,
   (c) a catalytic amount of a catalyst for the production of the polyurethane foam,
   (d) 1–10 parts by weight of a blowing agent,
   (e) 3.5 to 7.9 parts by weight of a flame retardant, and,
   (f) a foam stabilizing amount of a siloxane-oxyalkylene copolymer selected from the group consisting of copolymers having the average structural formulae $R_aSi[(OSiMe_2)_n(OSiMeG)_dOSiMe_2G]_{4-a}$, (i)

$GMe_2Si(OSiMe_2)_n(OSiMeG)_bOSiMe_2G$, (ii)

$Me_3Si(OSiMe_2)_n(OSiMeG)_cOSiMe_3$, (iii)

$R_aSi[(OSiMe_2)_n(OSiMeG)_cOSiMe_3]_{4-a}$ (iv)

or mixtures thereof, in which formulae R is a hydrocarbon radical free of aliphatic unsaturation and contains from 1 to 10 carbon atoms,
   Me is a methyl radical,
   G is a radical of the structure —D(OR")$_m$A wherein D is an alkylene radical containing from 1 to 30 carbon atoms,
   R" is composed of ethylene radicals and radicals selected from the group consisting of propylene and butylene radicals, the amount of ethylene radicals relative to the other alkylene radicals being such that the ratio of carbon atoms to oxygen atoms in the total OR" block ranges from 2.3:1 to 2.8:1,
   m has an average value from 25 to 100,
   A is a radical selected from the group consisting of the —OR', —OOCR' and

radicals wherein R' is a radical free of aliphatic unsaturation selected from the group consisting of hydrocarbon and hydrocarbonoxy radicals, the A radical containing a total of less than eleven atoms,
   a has an average value from 0–1,
   n has an average value from 6–420,
   d has an average value from 0–30,
   b has an average value from 1–30, and
   c has an average value from 3–30 to the extent that the ratio of total Me$_2$SiO units to total

units is within the range of 3.5:1 to 15:1,
   (II) thereafter allowing the mixture to foam, and
   (III) curing the foamed composition.

2. The method of claim 1 wherein a copolymer of the average formula Me$_3$Si(OSiMe$_2$)$_n$(OSiMeG)$_c$OSiMe$_3$ wherein n has an average value of about 140, c has an average value of about 15.8, the Me$_2$SiO to

unit ratio has an average value of about 8.85 and G is essentially

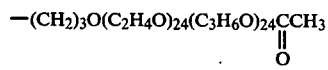

is employed as component I(f), the foam stabilizing siloxane-oxyalkylene copolymer.

3. The method of claim 1 wherein a copolymer of the average formula GMe$_2$Si(OSiMe$_2$)$_n$(OSiMeG)-

$b$OSiMe$_2$G wherein n has an average value of 56, b has an average value of 4, the Me$_2$SiO to $$\begin{array}{c}-\text{SiO}\\|\\G\end{array}$$

unit ratio has an average value of 9.3 and G is essentially —(CH$_2$)$_3$O(C$_2$H$_4$O)$_{24}$—

$$(C_3H_6O)_{24}\underset{\underset{O}{\|}}{C}CH_3,$$

is employed as component I(f), the foam stabilizing siloxane-oxyalkylene copolymer.

4. The method of claim 1 wherein a mixture of copolymers having the average formulae GMe$_2$Si(OSiMe$_2$)$_n$(OSiMeG)$_b$OSiMe$_2$G and Me$_3$Si(OSiMe$_2$)$_n$—(OSiMeG)$_c$OSiMe$_3$ wherein n in each case has an average value of about 140, b and c each have an average value of about 15.8, the ratio of total Me$_2$SiO units to $$\begin{array}{c}-\text{SiO}\\|\\G\end{array}$$

units has an average value of about 8.85 and G is essentially $$-(CH_2)_3O(C_2H_4O)_{24}(C_3H_6O)_{24}\underset{\underset{O}{\|}}{C}CH_3$$

is employed as component I(f), the foam stabilizing siloxane-oxyalkylene copolymer.

5. The method of claim 1 wherein a copolymer of the average formula Me$_3$Si(OSiMe$_2$)$_n$(OSiMeG)$_c$OSiMe$_3$ wherein n has an average value of about 135.9, c has an average value of about 21.9, the Me$_2$SiO to $$\begin{array}{c}\text{SiO}\\|\\G\end{array}$$

unit ratio has an average value of 6.2 and G is essentially $$-(CH_2)_3O(C_2H_4O)_{24}(C_3H_6O)_{24}\underset{\underset{O}{\|}}{C}CH_3, \text{ is}$$

employed as component I(f), the foam stabilizing siloxaneoxyalkylene copolymer.

6. The method of claim 1 wherein a mixture of copolymers having the average formula GMe$_2$Si(OSiMe$_2$)$_n$(OSiMeG)$_b$OSiMe$_2$G and Me$_3$Si(OSiMe$_2$)$_n$—(OSiMeG)$_c$OSiMe$_3$ wherein n in each case has an average value of about 136, b and c each have an average value of about 22, the ratio of total Me$_2$SiO units to $$\begin{array}{c}-\text{SiO}\\|\\G\end{array}$$

units has an average value of about 6.2 and G is essentially $$-(CH_2)_3O(C_2H_4O)_{24}(C_3H_6O)_{24}\underset{\underset{O}{\|}}{C}CH_3$$

is employed as component I(f), the foam stabilizing siloxane-oxyalkylene copolymer.

7. The method of claim 1 wherein a copolymer of the average formula $$R_aSi[(OSiMe_2)_n(OSiMeG)_dOSiMe_2G]_{4-a}$$

wherein R is methyl, a has an average value of O, n has an average value of 121, d has an average value of 20, the Me$_2$SiO to $$\begin{array}{c}-\text{SiO}\\|\\G\end{array}$$

unit ratio has an average value of 5.75 and G is essentially $$-(CH_2)_3O(C_2H_4O)_{24}(C_3H_6O)_{24}\underset{\underset{O}{\|}}{C}CH_3,$$

is employed a component I(f), the foam stabilizing siloxane-oxyalkylene copolymer.

8. The method of claim 1 wherein a copolymer of the average formula $$R_aSi[(OSiMe_2)_n(OSiMeG)_cOSiMe_3]_{4-a}$$

wherein R is methyl, a has an average value of about 1, n has an average value of about 84, c has an average value of about 21, the Me$_2$SiO to $$\begin{array}{c}\text{SiO}\\|\\G\end{array}$$

unit ratio has an average value of about 4.0 and G is essentially $$-(CH_2)_3O(C_2H_4O)_{24}(C_3H_6O)_{24}\underset{\underset{O}{\|}}{C}CH_3$$

is employed as component I(f), the foam stabilizing siloxane-oxyalkylene copolymer.

9. The method of claim 1 wherein a copolymer of the average formula GMe$_2$Si(OSiMe$_2$)$_n$(OSiMeG)$_b$OSiMe$_2$G wherein n has an average value of 56, b has an average value of 4, the Me$_2$SiO to $$\begin{array}{c}\text{SiO}\\|\\G\end{array}$$

unit ratio has an average value of 7.0 and G is essentially $$-(CH_2)_3O(C_2H_4O)_{24}(C_3H_6O)_{24}-\underset{\underset{O}{\|}}{C}CH_3$$

is employed as component I(f), the foam stabilizing siloxane-oxyalkylene copolymer.

10. A flexiable one-shot polyether based polyurethane foam composition which consists essentially of (a) 100 parts by weight of a polyether containing at least two hydroxyl groups,
(b) sufficient amount of organic polyisocyanate to give 90 - 120 percent, on a stoichiometric basis, of isocyanate radicals for each hydroxyl radical in the composition,
(c) 0.05-0.6 parts by weight of a catalyst,
(d) 1-10 parts by weight of a blowing agent,
(e) 3.5 to 7.9 parts by weight of a flame retardant,
(f) a foam stabilizing amount of a siloxane-oxyalkylene copolymer selected from the group consisting of copolymers having the average structural formulae $R_aSi[(OSiMeHd2)_n(OSiMeG)_dOSiMe_2G]_{4-a}$, (i)

$GMe_2Si(OSiMe_2)_n(OSiMeG)_bOSiMe_2G$, (ii)

$Me_3Si(OSiMe_2)_n(OSiMeG)_cOSiMe_3$, (iii)

$R_aSi[(OSiMe_2)_n(OiMeG)_cOSiMe_3]_{4-a}$ (iv)

or mixtures thereof, in which formulae R i a hydrocarbon radical free of aliphatic unsaturation and contains from 1 to 10 carbon atoms,
Me is a methyl radical,
G is a radical of the structure $-D(OR'')_mA$ wherein D is an alkylene radical containing from 1 to 30 carbon atoms,
R'' is composed of ethylene radicals and radicals selected from the group consisting of propylene and butylene radicals, the amount of ethylene radicals relative to the other alkylene radicals being such that the ratio of carbon atoms to oxygen atoms in the total OR'' block ranges from 2.3:1 to 2.8:1,
m has an average value from 25 to 100,
A is a radical selected from the group consisting of the —OR', —OOCR' and $$-\underset{\underset{O}{\|}}{O}COR'$$

radicals wherein R' is a radical free of aliphatic unsaturation selected from the group consisting of hydrocarbon and hydrocarbonoxy radicals, the A radical containing a total of less than eleven atoms, a has an average value from 0–1,
n has an average value from 6–420,
d has an average value from 0–30,
b has an average value from 1–30, and
c has an average value from 3–30 to the extent that the ratio of total $Me_2SiO$ units to total $$-\underset{\underset{G}{|}}{Si}-O$$

units is within the range of 3.5:1 to 15:1.

11. A flexiable one-shot polyether based polyurethane foam composition as in claim 10 wherein
(a) is 100 parts by weight of a polyether containing at least two hydroxyl groups,
(b) is 53 parts by weight of toluene diisocyanate in the 80:20 ratio of isomeric 2,4 and 2,6 to give 105 percent of the stoichiometric amount of necessary isocyanate,
(c) 0.40 parts by weight of catalyst,
(d) 8.75 parts by weight of a blowing agent,
(e) 8.0 parts by weight of a flame retardant, and
(f) 1.4 parts by weight of foam stabilizing amount of a siloxane oxyalkylene copolymer.

12. A flexiable one-shot polyether based polyurethane foam composition as in claim 11 wherein (f) is a mixture of copolymers having the average formulae $GMe_2Si(OSiMe_2)_n(OSiMeG)_bOSiMe_2G$ and $Me_3Si(OSiMe_2)_n-(OSiMeG)_cOSiMe_3$ wherein n in each case has an average value of about 140, b and c each have an average value of about 15.8, the ratio of total $Me_2SiO$ units to $$-\underset{\underset{G}{|}}{Si}O$$

units has an average value of about 8.85 and G is essentially $$-(CH_2)_3O(C_2H_4O)_{24}(C_3H_6O)_{24}\underset{\underset{O}{\|}}{C}CH_3.$$

13. A flexiable one-shot polyether based polyurethane foam composition as in claim 12 wherein (f) is present in 1.0 parts by weight.

* * * * *

UNITED STATES PATENT AND TRADEMARK OFFICE
CERTIFICATE OF CORRECTION

PATENT NO. : 4,147,847
DATED : April 3, 1979
INVENTOR(S) : Carl W. Schweiger

It is certified that error appears in the above-identified patent and that said Letters Patent are hereby corrected as shown below:

In Column 3, line 55; the word reading "steps" should read "step".

In Column 7, line 65; the formula reading

"$(HMe_2Si)_2O(Me_2SiO)_{106}(MeHSiO-_{17}$" should read

"$(HMe_2Si)_2O(Me_2SiO)_{106}(MeHSiO)_{17}$".

In Column 7, line 66; the formula reading

"$(Me_3Si)_2O(Me_2SiO)_{106}(MeHSiO-_{17}$" should read

"$(Me_3Si)_2O(Me_2SiO)_{106}(MeHSiO)_{17}$".

In Column 8, line 45; delete the formula reading

"$(Me_3Si)_2O(Me_2Si-$".

In Column 8, line 46; delete the formula reading "$O)_{84}(MeSiO)_{21}$".

UNITED STATES PATENT AND TRADEMARK OFFICE
CERTIFICATE OF CORRECTION

PATENT NO. : 4,147,847

DATED : April 3, 1979

INVENTOR(S) : Carl W. Schweiger

It is certified that error appears in the above-identified patent and that said Letters Patent are hereby corrected as shown below:

In Column 13, line 19; the formula reading

"$_n-(OSiMeG)_c OSiMe_3$" should read "$_n(OSiMeG)_c OSiMe_3$".

In Column 13, line 58; the formula reading

"$_n-(OSiMeG)_c OSiMe_3$" should read "$_n(OSiMeG)_c OSiMe_3$".

In Column 14, line 61; the formula reading

"$-(CH_2)_3 O(C_2H_4O)_{24}(C_3H_6O)_{24}-\underset{O}{\overset{\|}{C}}CH_3$" should read "$-(CH_2)_3 O(C_2H_4O)_{24}(C_3H_6O)_{24}\underset{O}{\overset{\|}{C}}CH_3$".

In Column 15, line 15; the formula reading

"$R_a Si[(OSiMeHd\ 2)_n (OSiMeG)_d OSiMe_2 G]_{4-a}$" should read

"$R_a Si[(OSiMe_2)_n (OSiMeG)_d OSiMe_2 G]_{4-a}$".

In Column 15, line 21; the formula reading

"$R_a Si[(OSiMe_2)_n (OiMeG)_c OSiMe_3]_{4-a}$" should read

"$R_a Si[(OSiMe_2)_n (OSiMeG)_c OSiMe_3]_{4-a}$".

UNITED STATES PATENT AND TRADEMARK OFFICE
CERTIFICATE OF CORRECTION

PATENT NO. : 4,147,847
DATED : April 3, 1979
INVENTOR(S) : Carl W. Schweiger

It is certified that error appears in the above–identified patent and that said Letters Patent are hereby corrected as shown below:

In Column 15, line 23; the word reading "i" should read "is".

In Column 16, line 30; the formula reading

"$Si(OSiMe_2)_n-(OSiMeG)_cOSiMe_3$" should read

"$Si(OSiMe_2)_n(OSiMeG)_cOSiMe_3$".

Signed and Sealed this

Twenty-ninth Day of December 1981

[SEAL]

Attest:

GERALD J. MOSSINGHOFF

Attesting Officer

Commissioner of Patents and Trademarks